United States Patent
Yeh

(10) Patent No.: US 8,308,337 B2
(45) Date of Patent: Nov. 13, 2012

(54) LIGHT GUIDE PLATE, BACKLIGHT MODULE AND LIQUID CRYSTAL DISPLAY

(75) Inventor: Yao-Chung Yeh, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 539 days.

(21) Appl. No.: 12/318,547

(22) Filed: Dec. 31, 2008

(65) Prior Publication Data

US 2010/0073913 A1 Mar. 25, 2010

(30) Foreign Application Priority Data

Sep. 22, 2008 (TW) .............................. 97136370 A

(51) Int. Cl.
*F21V 7/04* (2006.01)
(52) U.S. Cl. ........................................ 362/620; 362/336
(58) Field of Classification Search .................. 362/326, 362/330, 332, 333, 336, 337, 600, 608–626; 349/57, 59, 61, 62, 65, 69, 70
See application file for complete search history.

(56) References Cited

U.S. PATENT DOCUMENTS

| | | | | |
|---|---|---|---|---|
| 4,673,254 A * | 6/1987 | Kato et al. | ..................... | 359/599 |
| 5,079,675 A * | 1/1992 | Nakayama | ..................... | 362/613 |
| 5,339,179 A * | 8/1994 | Rudisill et al. | ..................... | 349/65 |
| 5,546,235 A * | 8/1996 | Park | ..................... | 359/742 |
| 5,584,556 A * | 12/1996 | Yokoyama et al. | ..................... | 362/625 |
| 5,971,559 A * | 10/1999 | Ishikawa et al. | ..................... | 362/625 |
| 5,999,685 A * | 12/1999 | Goto et al. | ..................... | 385/146 |
| 6,836,368 B2 | 12/2004 | Niida et al. | | |
| 6,854,855 B2 * | 2/2005 | Munro et al. | ..................... | 362/620 |
| 7,195,732 B2 * | 3/2007 | Umeki | ..................... | 264/496 |
| 7,262,916 B2 * | 8/2007 | Kao et al. | ..................... | 359/599 |
| 7,374,329 B2 * | 5/2008 | Feng et al. | ..................... | 362/626 |
| 7,384,173 B2 * | 6/2008 | Whitney | ..................... | 362/330 |
| 7,841,749 B2 * | 11/2010 | Kim et al. | ..................... | 362/332 |
| 2005/0047112 A1 | 3/2005 | Chen et al. | | |
| 2008/0239204 A1 * | 10/2008 | Lee et al. | ..................... | 349/65 |

FOREIGN PATENT DOCUMENTS

| | | |
|---|---|---|
| CN | 1837927 A | 9/2006 |
| JP | 06-222207 | 8/1994 |
| JP | 07-234305 | 9/1995 |
| JP | 10-319242 | 12/1998 |
| JP | 2001-343532 | 12/2001 |

* cited by examiner

*Primary Examiner* — Hargobind S Sawhney
(74) *Attorney, Agent, or Firm* — Bacon & Thomas, PLLC

(57) ABSTRACT

A light guide plate, a backlight module and a liquid crystal display are provided. The light guide plate has a first surface at least having one first structure and one second structure formed thereon. The first structure and the second structure are adjacent arranged and are mirror reflection with each other. Each of the first structure and the second structure has a first protrusion having a cross section of eccentric triangle.

15 Claims, 9 Drawing Sheets

LIGHT GUIDE PLATE, BACKLIGHT
MODULE AND LIQUID CRYSTAL DISPLAY

This application claims the benefit of Taiwan Patent Application Serial No. 97136370, filed Sep. 22, 2008, the subject matter of which is incorporated herein by reference.

BACKGROUND OF THE INVENTION

1. Field of the Invention

The present invention generally relates to a light guide plate, backlight module and a liquid crystal display, and especially relates to a light guide plate, a backlight module and a liquid crystal display using the same with higher luminance, light outputting efficiency and light concentration.

2. Description of Related Art

A liquid crystal display which can produce colorful image has been applied broadly to notebook computer, personal digital assistant and desktop and replaced traditional cathode ray tube display, because of its lightweight, lower power consumer and low radiation pollution.

FIG. 1 shows a conventional liquid crystal display (LCD). LCD 1 comprises backlight module 2, optical film 20 and liquid crystal display panel 30. Image L can be displayed successfully via the light produced by backlight module 2. Backlight module 2 comprises light guide plate 10, light source 50, cover 60 and reflector 40. Light guide plate 40 has upper surface 12, bottom surface 14 and light input surface 16. Light source 50 for providing light is disposed adjacent to the light input surface 16 of the light guide plate 10. Cover 60 protects light source 50. Light source 50 is a cold cathode fluorescent lamp (CCFL), disposed on the lamp holder (not shown), and lamp wire (not shown) extends from the lamp holder and is electrically connected with a connector. Alternatively, a plurality of light-emitting diodes (LEDs) or external electrode fluorescent lamp (EEFL).

Light guide plate 10 is for changing the path of the light. Light from the light source 50 can reach to the liquid crystal display panel 30 through light guide plate 10. Reflector 40 located under the light guide plate 10 is for reflecting light leaked out of the light guide plate 10, in order to increase reflective efficiency of light.

Optical film 20 above the light guide plate 10 is for further treatment of light, for example, light concentration, diffusion or uniformity. Optical film 20 may be prism lens and/or diffuser. Number of optical film can be one or more. However, because of the optical film 20, it is difficult to control the brightness and uniformity of the light from the backlight module 2.

SUMMARY OF THE INVENTION

Accordingly, the present invention is directed to a light guide plate which has better ability of light concentration.

An objective of the present invention is to provide a backlight module which provides brighter light, higher light output efficiency and better ability of light concentration.

An objective of the present invention is to provide a light guide plate which keeps symmetry of light output at parallel viewing angles.

An objective of the present invention is to provide a light guide plate which can reduce the usage number of optical films.

In accordance with the above objectives and other objectives, the present invention provides a light guide plate, having a first surface with at least one first structure and at least one second structure, wherein: the first structure and the second structure are adjacent arranged and are mirror reflection with each other; the first structure includes at least one first protrusion having a cross section of a eccentric triangle; and the second structure includes at least one second protrusion having a cross section of a eccentric triangle.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
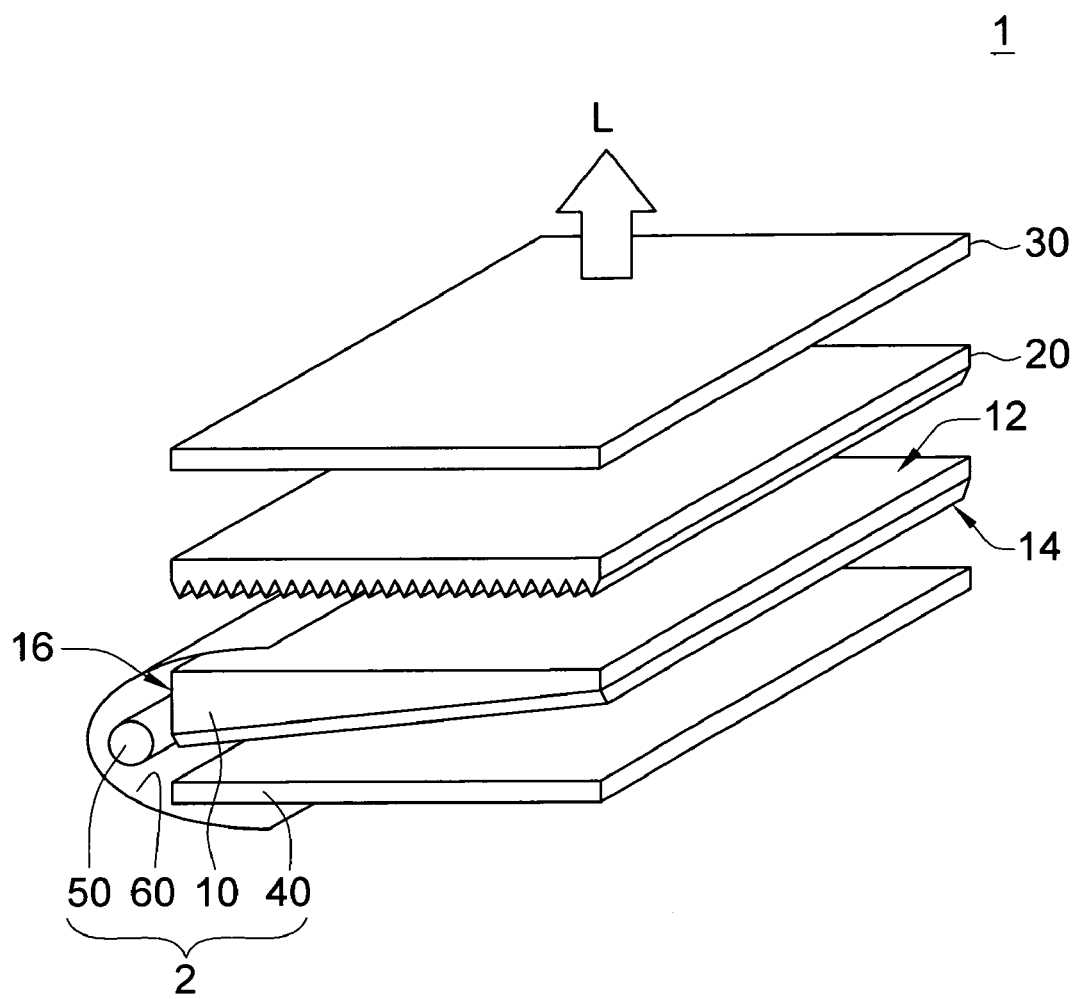
FIG. 1 shows a perspective view of a conventional liquid crystal display.

Reference will now be made in detail to the present preferred embodiments of the invention, examples of which are illustrated in the accompanying drawings. Wherever possible, the same reference numbers are used in the drawings and the description to refer to the same or like parts.

FIGS. 2A to 13 show light guide plates according to the embodiments of the present invention. For easy to understand and explanation, light source 50 is added therein to show the location relationship with the light guide plate. Location relationships among the light guide plate, the reflector, the optical films and the liquid crystal display panel can be referred to FIG. 1, which people of ordinary skill in the art can understand, but not limited thereto.

Figure 2A:
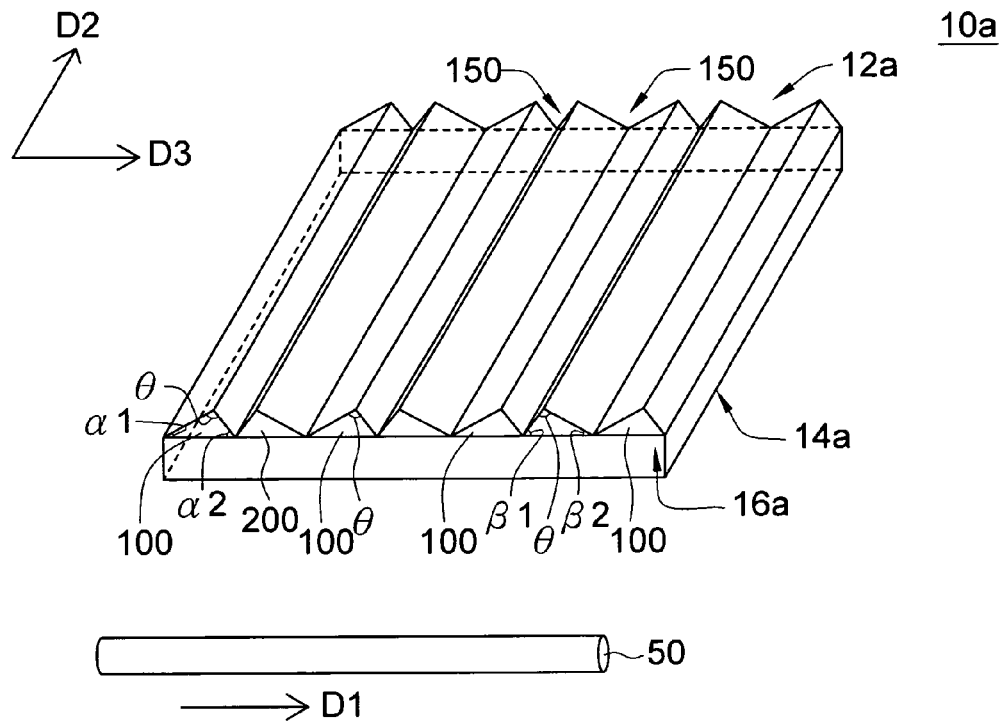
FIGS. 2A to 13 show light guide plates according to the embodiments of the present invention.

As shown in FIG. 2A, light guide plate 10a has upper surface 12a at least with first structure 100 and second structure 200. In the present embodiment, first structures 100 and second structures 200 are plural, for example, but not limited thereto. First structure 100 and second structure 200 are adjacent arranged and are mirror reflection with each other. First structure 100 and second structure 200 have first protrusion (not shown) and second protrusion (not shown), respectively. First protrusion and second protrusion have a cross section of an eccentric triangle. Specifically, first protrusion and second protrusion are V-shaped (V-cut). The eccentric triangle has a top angle θ of about 80 degree to 140 degree, a bottom angle α1(β1) and a bottom angle α2(β2), wherein the bottom angles α1 and α2 (β1 and β2) are with difference of about 2 degree to 30 degree. The bottom angle α1 is about equal to bottom angle β2, the bottom angle α2 is about equal to bottom angle β1, and the bottom angle α1 is substantially connected with bottom angle β2.

Light guide plate 10a has bottom surface 14a opposite to the upper surface 12a. The bottom surface 14a is with a flat, a sand-blasting pattern or a dots pattern, for example.

More specifically, light source 50 is located adjacent to the light input surface 14a. Because of the light provided by the light source 50 and the function of guiding light and concentration of the light guide plate 10a, light can pass in the liquid crystal display panel 30 from the upper surface 12a. Light source 50 can be LEDs, CCFLs, EEFLs or the combinations thereof, for example. Extension direction D1 of the light source 50 and extension direction D2 of the first protrusion (and the second protrusion) form an angle of about 75 degree to 105 degree. In the present embodiment, the said angle is about 90 degree, for example, but not limited thereto. First structure 100 and second structure 200 are interlaced along the third direction D3 as shown in the FIG. 2A. Because of the first structure 100 and second structure 200, backlight module 2 has higher brightness, light output efficiency and light concentration.

Figure 2B:
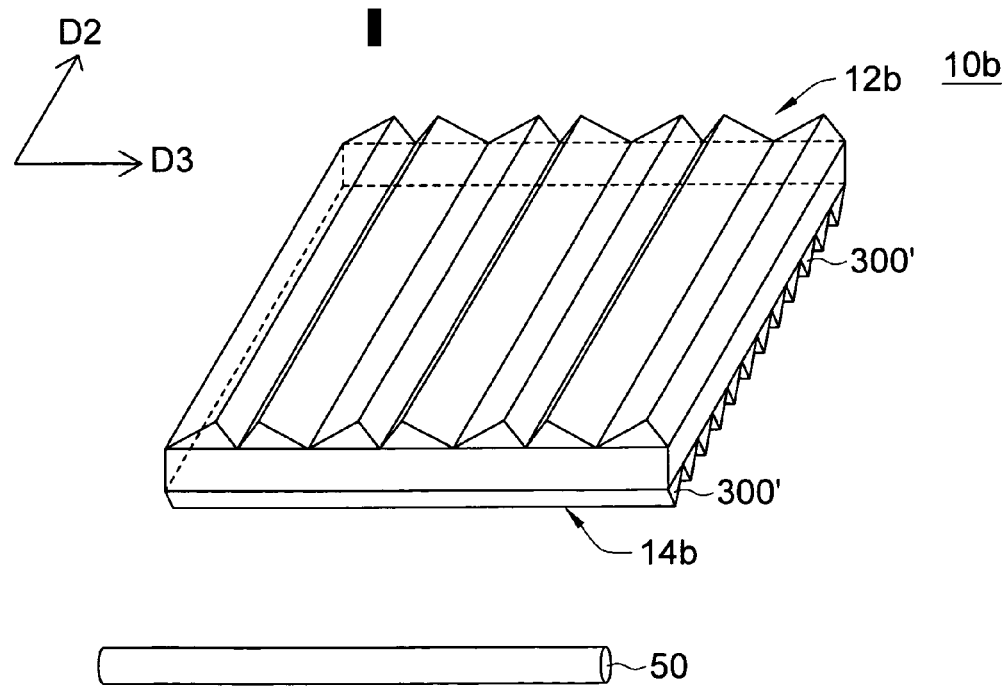

As shown in FIG. 2B, light guide plate 10b according to another embodiment of the present invention is similar to the light guide plate 10a. Upper surface 12b of the light guide plate 10b is the same as the upper surface 12a of the light guide plate 10a. The difference is that the bottom surface 14b of the light guide plate 10b is with V-shaped protrusions 300'. V-shaped protrusions 300' have a cross-section of an equilateral triangle, an isosceles triangle or an eccentric triangle. Each V-shaped protrusion are of same structure. Extension direction D3 of the V-shaped protrusions 300' is substantially parallel to the extension direction D1 of the light source 50, for example.

Figure 3A:
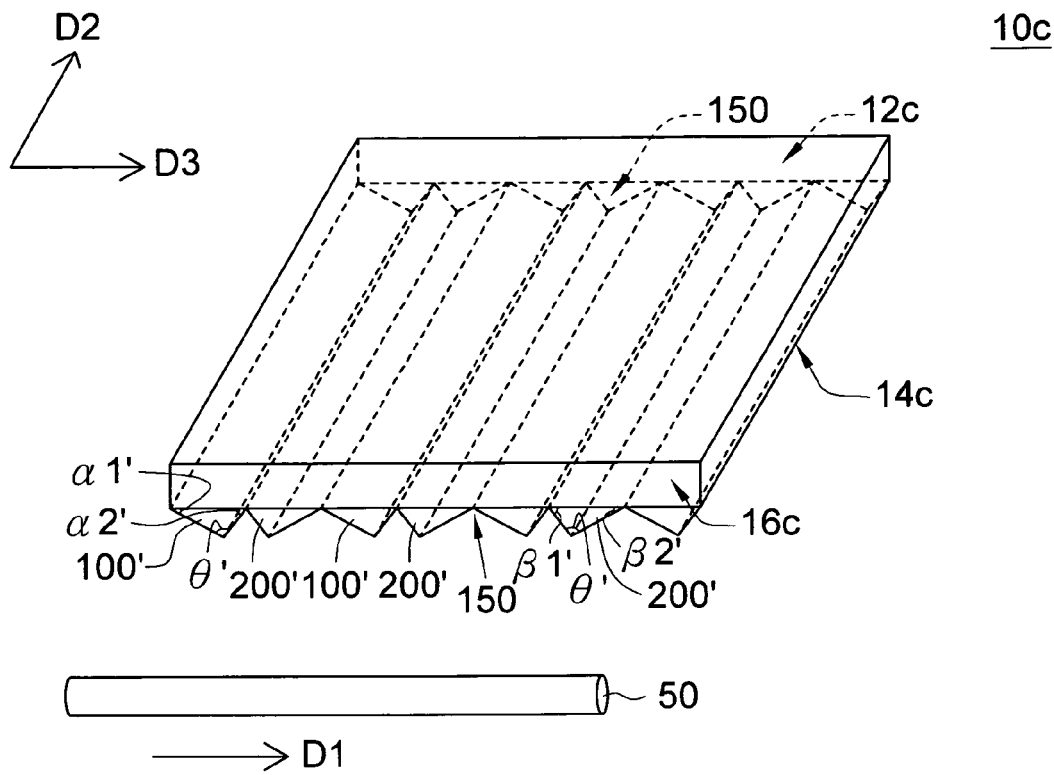

As shown in FIG. 3A, according to the present embodiment of the present invention, light guide plate 10c has bottom surface 14c with at least one first structure 100' and second structure 200'. In the present embodiment, first structures 100' and second structures 200' are plural, for example. First structure 100' and second structure 200' are adjacent arranged and are mirror reflection with each other. First structure 100' and second structure 200' have first protrusion (not shown) and second protrusion (not shown), respectively. First protrusion and second protrusion have a cross section of an eccentric triangle. Specifically, first protrusion and second protrusion are V-shaped (V-cut). The eccentric triangle has a top angle θ' of about 80 degree to 140 degree, a bottom angle α1' (β1') and a bottom angle α2' (β2'), wherein the bottom angles α1' and α2' (β1' and β2') are with difference of about 2 degree to 30 degree. The bottom angle α1' is about equal to bottom angle β2', the bottom angle α2' is about equal to bottom angle β1', and the bottom angle α1' is substantially connected with bottom angle β2'.

Light guide plate 10c has upper surface 12c opposite to the bottom surface 14c. The upper surface 12c is with a flat, a sand-blasting pattern or a dots pattern, for example.

More specifically, light source 50 is located adjacent to the light input surface 14c of the light guide plate 10c. Because of the light provided by the light source 50 and the function of guiding light and concentration of the light guide plate 10c, light can pass in the liquid crystal display panel 30 from the upper surface 12c. Extension direction D1 of the light source 50 and extension direction D2 of the first protrusion (and the second protrusion) form an angle of about 75 degree to 105 degree. In the present embodiment, the said angle is about 90 degree, for example, but not limited thereto. First structure 100' and second structure 200' are interlaced along the third direction D3 as shown in the FIG. 3A. Because of the first structure 100' and second structure 200', backlight module 2 has higher brightness, light output efficiency and light concentration.

Figure 3B:
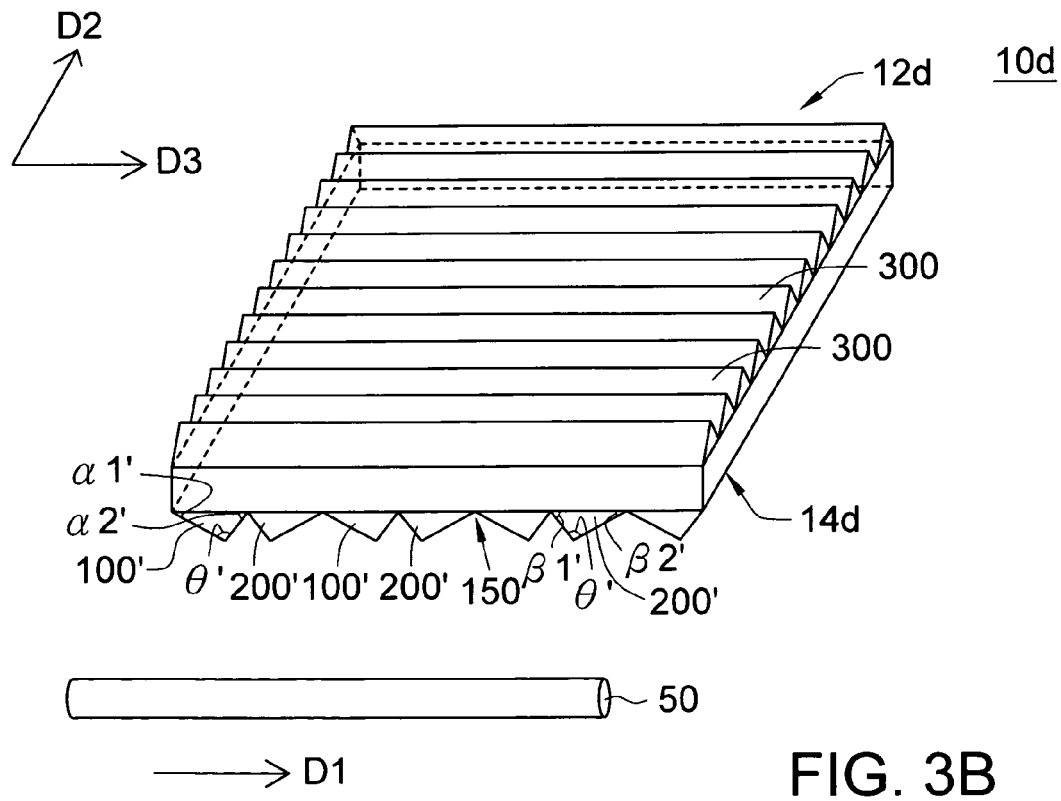

As shown in FIG. 3B, light guide plate 10d according to still another embodiment of the present invention is similar to the light guide plate 10c. Bottom surface 14d of the light guide plate 10d is the same as the bottom surface 14c of the light guide plate 10c. The difference is that the upper surface 12d of the light guide plate 10d is with V-shaped protrusions 300. V-shaped protrusions 300 have a cross-section of an equilateral triangle, an isosceles triangle or an eccentric triangle. Each V-shaped protrusion are of same structure. Extension direction D3 of the V-shaped protrusions 300' is substantially parallel to the extension direction D1 of the light source 50, for example.

Figure 4:
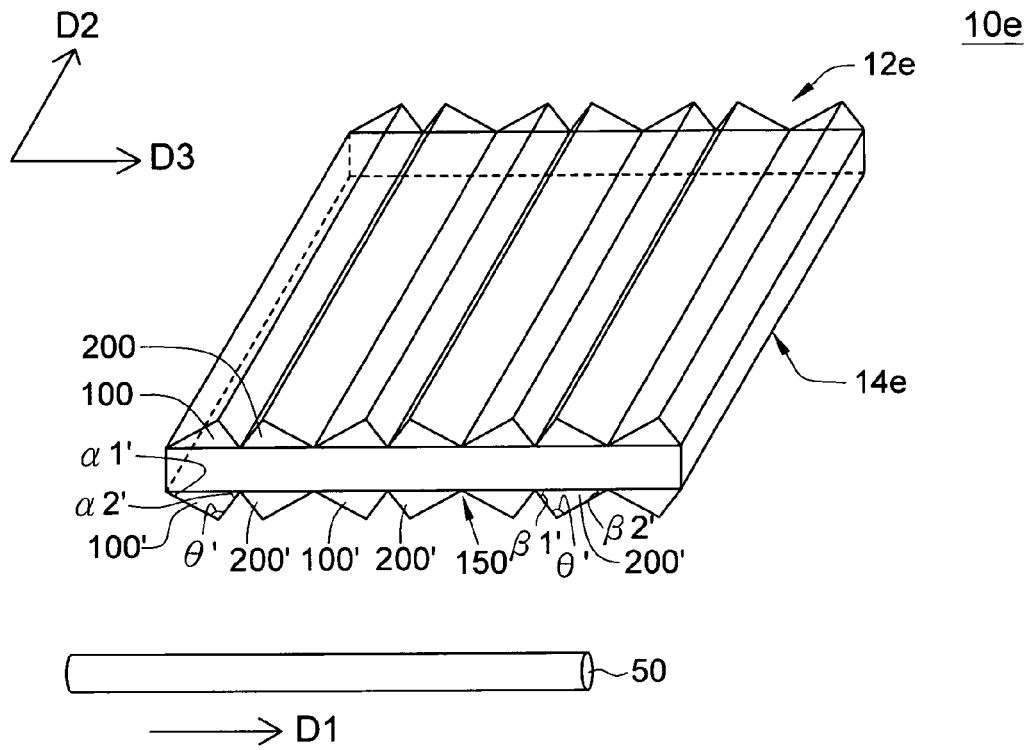

As shown in FIG. 4, according to the present embodiment of the present invention, light guide plate 10e has upper surface 12e as the same as the upper surface 12a of light guide plate 10a, and the light guide plate 10e further has lower surface 14e as the same as the bottom surface 14c of light guide plate 10c. In the present embodiment, extension direction of first structure 100 of the upper surface 12e and that of the first structure 100' of the bottom surface 14e are parallel to each other or totally overlapped, for example, but not limited thereto. Extension direction of the first structure 100 of the upper surface 12e and that of the first structure 100' of the bottom surface 14e may form an acute angle or a right angle. Furthermore, at least one of the extension directions of the first structure 100 of the upper surface 12e and that of the first structure 100' of the bottom surface 14e may be perpendicular to the extension direction D1 of the light source 50.

Figure 5:
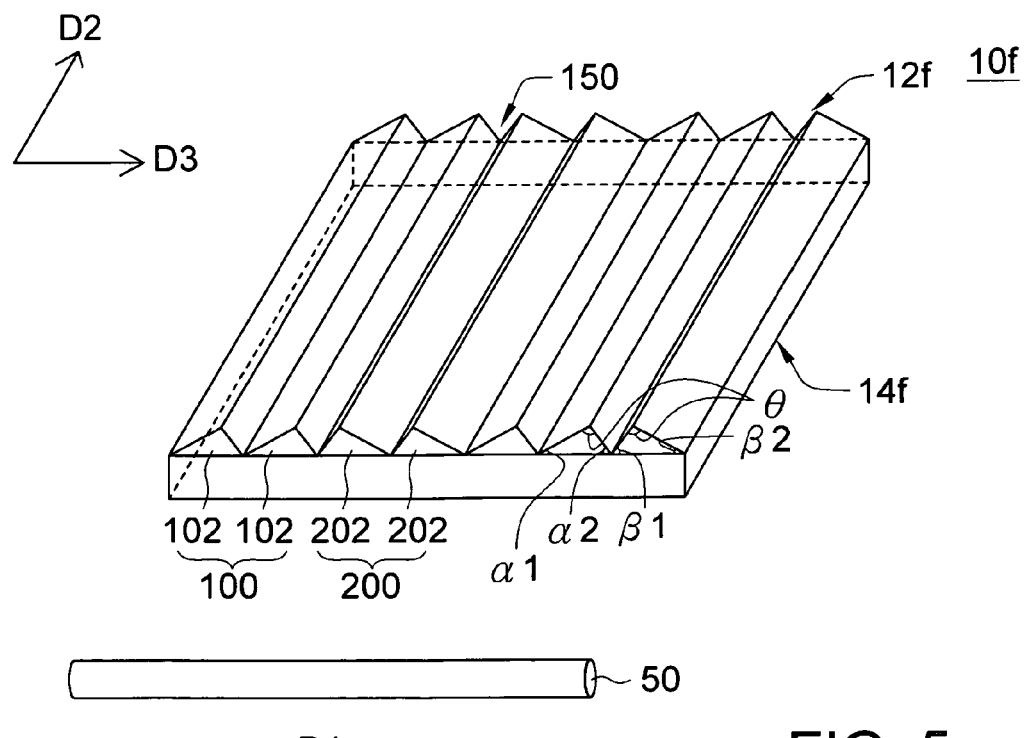

Referring to FIG. 5, light guide plate 10f of the present embodiment of the present invention has upper surface 12f with first protrusions 102 and second protrusions 202, wherein the first protrusions 102 constitute first structure 100, and the second protrusions 202 constitute second structure 200. In the first structure 100, first protrusions 102 are sequentially connected and have same structure. In the second structure 200, second protrusions 202 are sequentially connected and have same structure. In the present embodiment, first structure 100 and second structure 200 have two protrusions, respectively, for example. However, there is not limited, more than two (three or more, for example) protrusions may constitute a single first (or second) structure depending on the design demand. First structure 100 and second structure 200 are adjacent arranged and are mirror reflection with each other. First protrusion 102 and second protrusion 202 have a cross section of an eccentric triangle as shown in FIG. 5. More specifically, first protrusion 102 and second protrusion 202 are V-shaped (V-cut). The eccentric triangle has a top angle θ of about 80 degree to 140 degree, a bottom angle α1 (β1) and a bottom angle α2 (β2), wherein the bottom angles α1 and α2 (β1 and β2) are with difference of about 2 degree to 30 degree. The bottom angle α1 is about equal to bottom angle β2, the bottom angle α2 is about equal to bottom angle β1, and the bottom angle α1 is substantially connected with bottom angle β2.

Light guide plate 10f has a bottom surface 14f opposite to the upper surface 12f. The bottom surface 14f is with a flat, a sand-blasting pattern or a dots pattern, for example.

More specifically, light source 50 is located adjacent to the light input surface 16f of the light guide plate 10f. Because of the light provided by the light source 50 and the function of guiding light and concentration of the light guide plate 10f, light can pass in the liquid crystal display panel 30 from the upper surface 12f. Extension direction D1 of the light source 50 and extension direction D2 of the first protrusion 102 (and the second protrusion 202) form an angle of about 75 degree to 105 degree. In the present embodiment, the said angle is about 90 degree, for example, but not limited thereto. First structure 100 and second structure 200 are interlaced along the third direction D3 as shown in the FIG. 5. Because of the first structure 100 and second structure 200, backlight module 2 has higher brightness, light output efficiency and light concentration.

Figure 6:
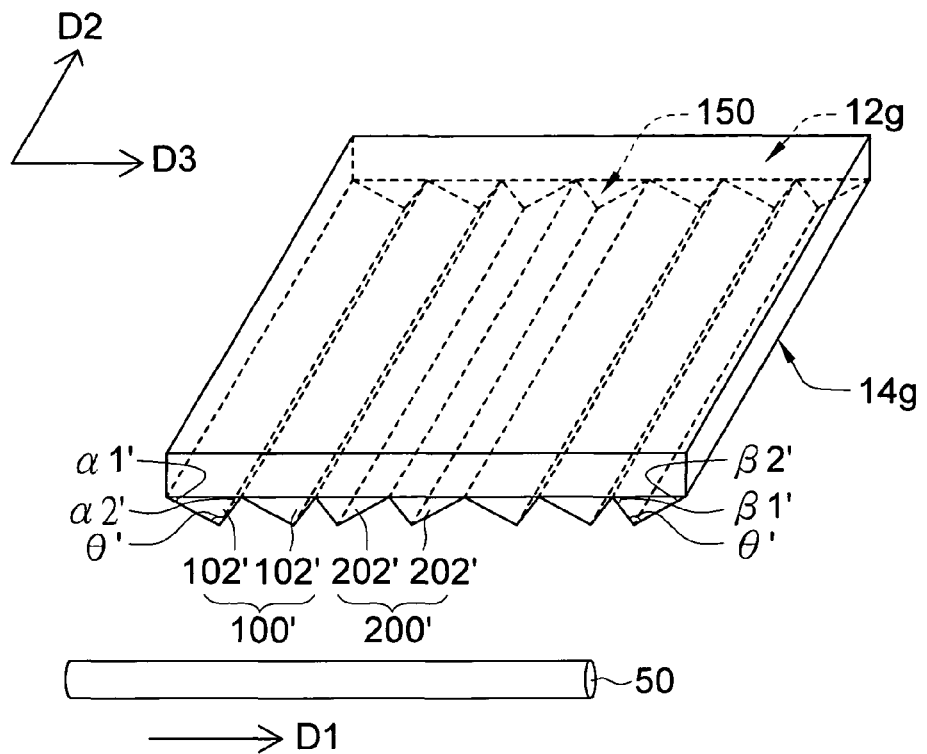

As shown in FIG. 6, light guide plate 10g of the present embodiment of the present invention has bottom surface 14f with first protrusions 102' and second protrusions 202', wherein the first protrusions 102' constitute first structure 100', and the second protrusions 202' constitute second structure 200'. In the first structure 100', first protrusions 102' are sequentially connected and have same structure. In the second structure 200', second protrusions 202' are sequentially connected and have same structure. In the present embodiment, first structure 100' and second structure 200' have two protrusions, respectively, for example. However, there is not limited, more than two (three or more, for example) protrusions may constitute a single first (or second) structure depending on the design demand. First structure 100' and second structure 200' are adjacent arranged and are mirror reflection with each other. First protrusion 102' and second protrusion 202' have a cross section of an eccentric triangle as shown in FIG. 6. More specifically, first protrusion 102' and second protrusion 202' are V-shaped (V-cut). The eccentric triangle has a top angle θ' of about 80 degree to 140 degree, a bottom angle α1' (β1') and a bottom angle α2' (β2'), wherein the bottom angles α1' and α2' (β1' and β2') are with difference of about 2 degree to 30 degree. The bottom angle α1' is about equal to bottom angle β2', the bottom angle α2' is about equal to bottom angle β1', and the bottom angle α1' is substantially connected with bottom angle β2'.

Light guide plate 10g has upper surface 12g opposite to the bottom surface 14g. The upper surface 12g is with a flat, a sand-blasting pattern or a dots pattern, for example.

More specifically, light source 50 is located adjacent to the light input surface 16g of the light guide plate 10g. Because of the light provided by the light source 50 and the function of guiding light and concentration of the light guide plate 10g, light can pass in the liquid crystal display panel 30 from the upper surface 12g. Extension direction D1 of the light source 50 and extension direction D2 of the first protrusion 102' (and the second protrusion 202') form an angle of about 75 degree to 105 degree. In the present embodiment, the said angle is about 90 degree, for example, but not limited thereto. First structure 100' and second structure 200' are interlaced along the third direction D3 as shown in the FIG. 6. Because of the first structure 100' and second structure 200', backlight module 2 has higher brightness, light output efficiency and light concentration.

Figure 7:
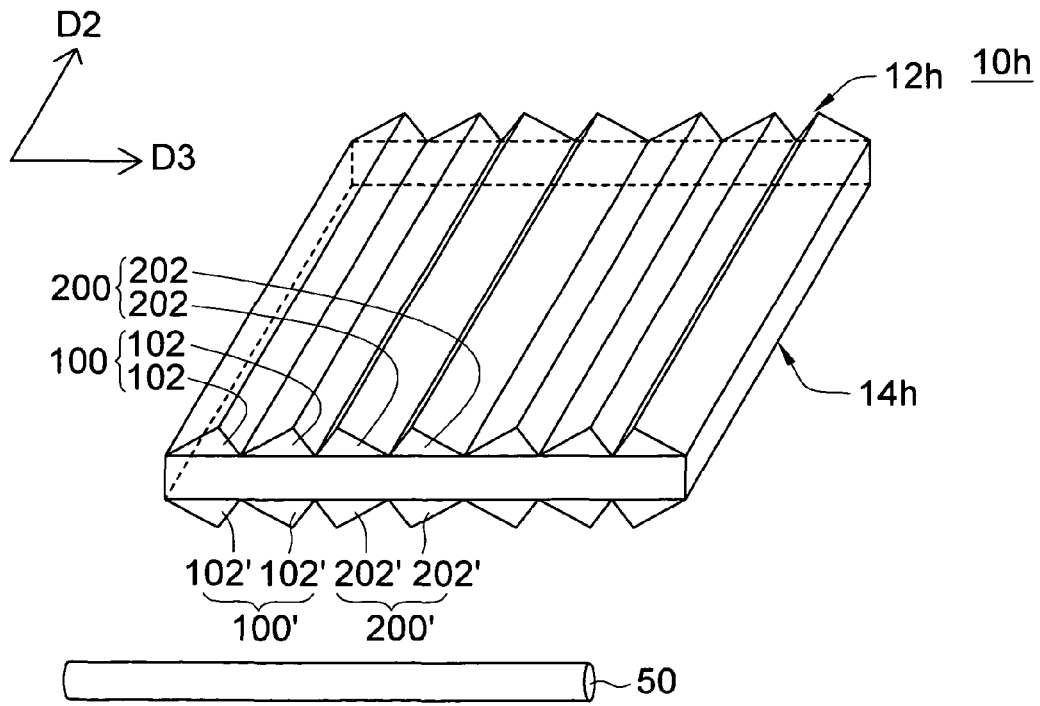

As shown in FIG. 7, according to the present embodiment of the present invention, light guide plate 10h has upper surface 12h as the same as the upper surface 12f of light guide plate 10f, and the light guide plate 10h further has lower surface 14h as the same as the bottom surface 14g of light guide plate 10g. In the present embodiment, extension direction of the first protrusion 102 of the upper surface 12h and that of the first protrusion 102' of the bottom surface 14h are parallel to each other or totally overlapped, for example, but not limited thereto. Extension direction of the first structure 100 of the upper surface 12h and that of the first structure 100' of the bottom surface 14h may form an acute angle or a right angle. Furthermore, at least one of the extension directions of the first structure 100 of the upper surface 12h and that of the first structure 100' of the bottom surface 14h may be perpendicular to the extension direction D1 of the light source 50.

Figure 8:
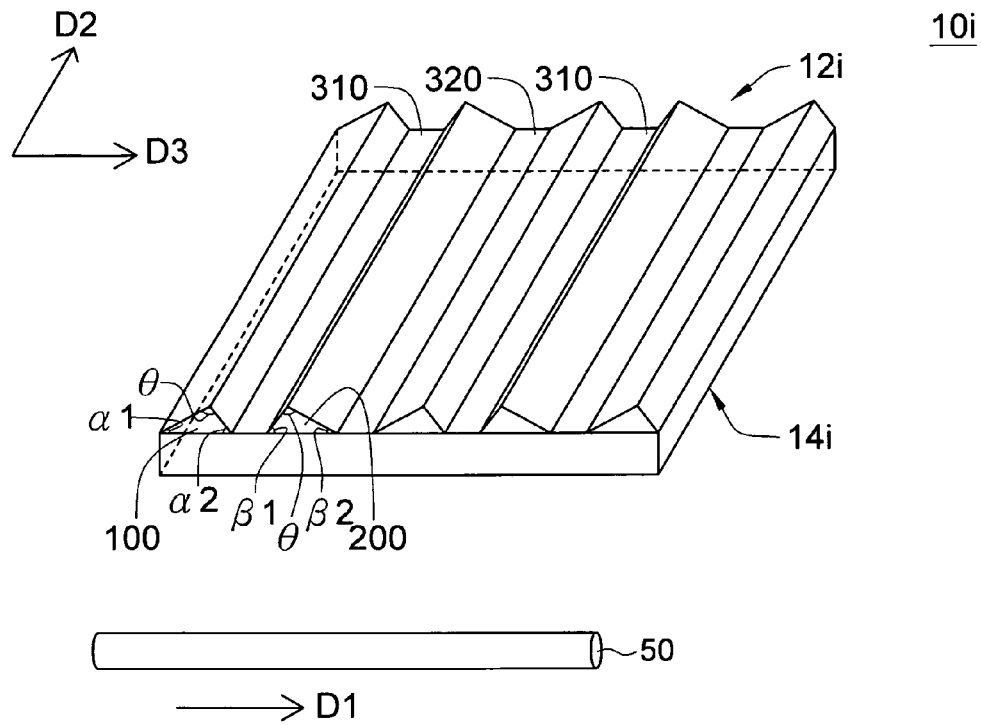

As shown in FIG. 8, light guide plate 10i according to still another embodiment of the present invention is similar to the light guide plate 10a. The difference is that connection flat 310 or 320 is located between first structure 100 and second structure 200. The connection flats 310, 320 are with a planar surface, a sand-blasting pattern or a dots pattern, for example. First structure 100 and second structure 200 are adjacent arranged and mirror reflection accordance with the connection flat 310 (320).

Figure 9:
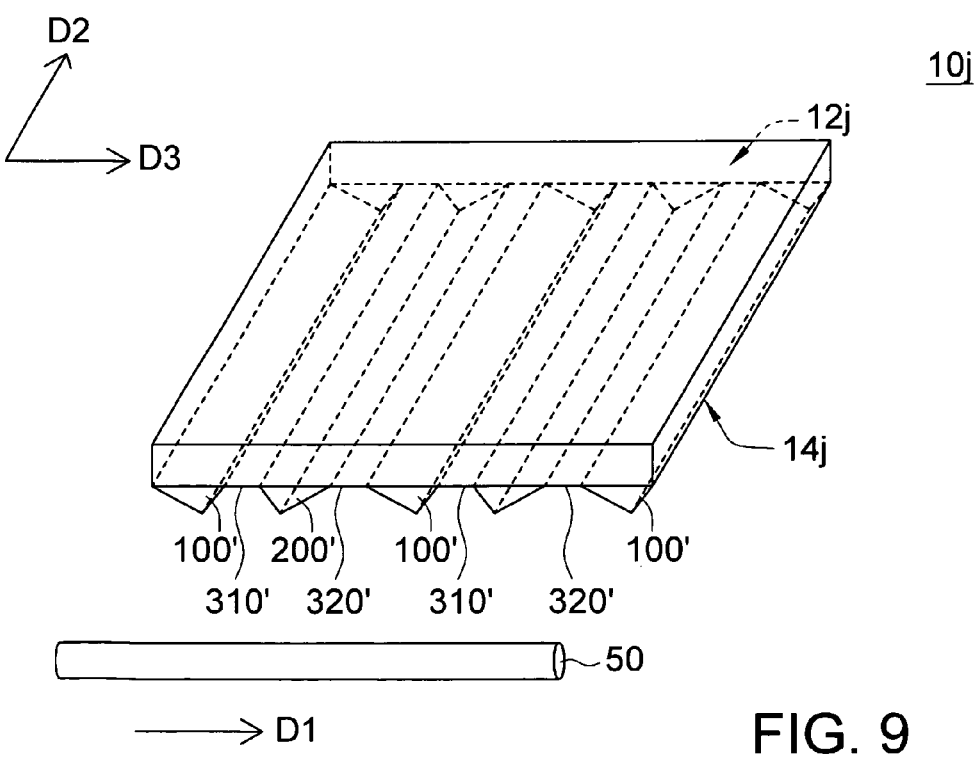

As shown in FIG. 9, light guide plate 10j according to still another embodiment of the present invention is similar to the light guide plate 10c. The difference is that connection flat 310' or 320' is located between first structure 100' and second structure 200'. The connection flats 310', 320' are with a planar surface, a sand-blasting pattern or a dots pattern, for example. First structure 100' and second structure 200' are adjacent arranged and mirror reflection accordance with the connection flat 310' (320').

Figure 10:
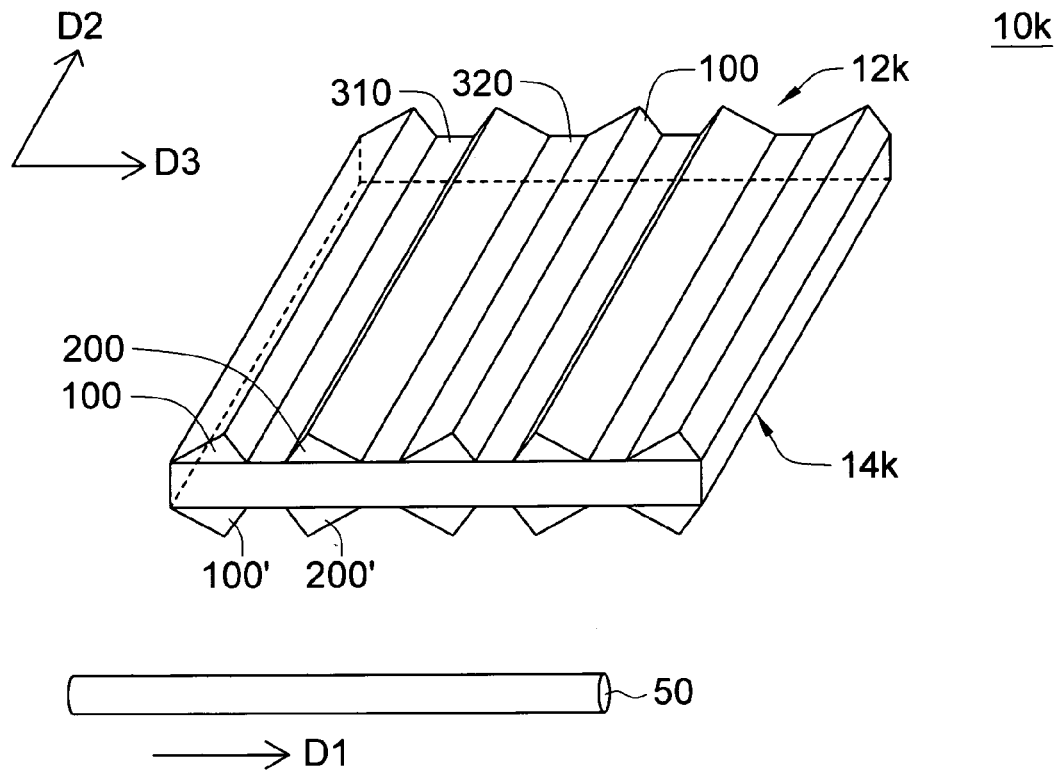

As shown in FIG. 10, in the present embodiment of the present invention, the upper surface 12k of light guide plate 10k is the same as the upper surface 12i of light guide plate 10i, and the bottom surface 14k is the same as the bottom surface 14j of the light guide plate 10j. In the present embodiment, extension direction of the first structure 100 of the upper surface 12k and that of the first protrusion 100' of the bottom surface 14k are parallel to each other or totally overlapped, for example, but not limited thereto. Extension direction of the first structure 100 of the upper surface 12k and that of the first structure 100' of the bottom surface 14k may form an acute angle or a right angle. Furthermore, at least one of the extension directions of the first structure 100 of the upper surface 12k and that of the first structure 100' of the bottom surface 14k may be perpendicular to the extension direction D1 of the light source 50.

Figure 11:
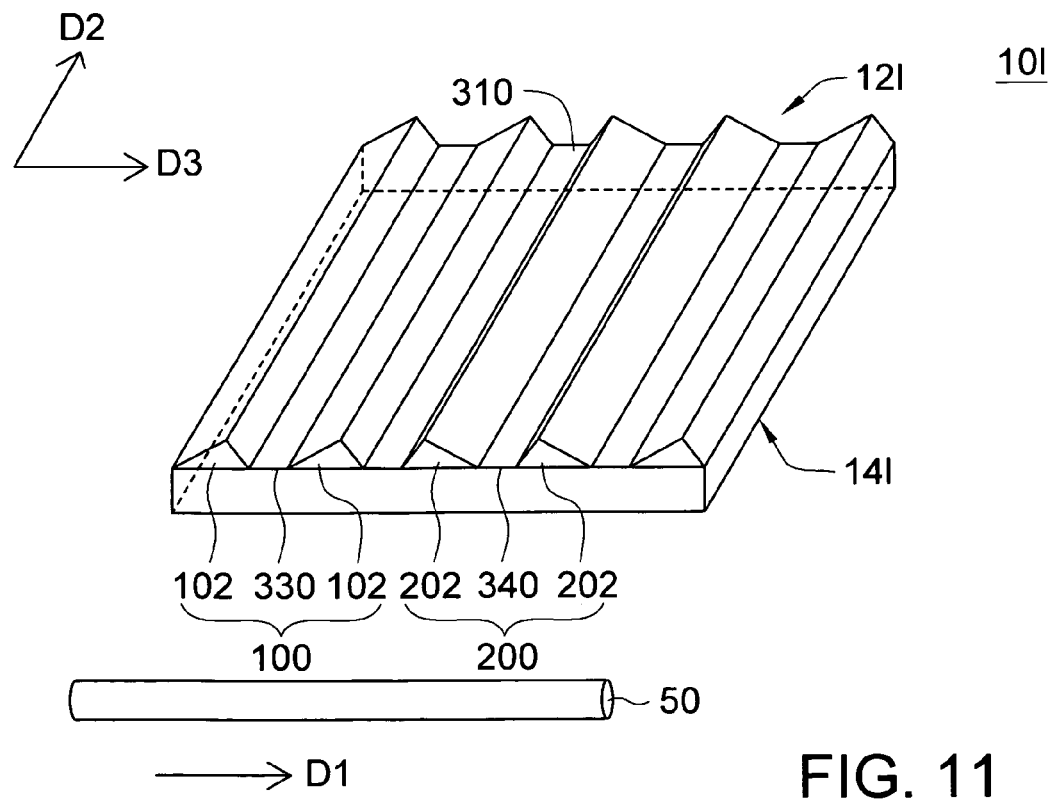

As shown in FIG. 11, light guide plate 10l according to the present embodiment of the present invention is similar to the light guide plate 10f. The difference is that connection flat 310 is located between first structure 100 and second structure 200. The connection flat 330 is located between two adjacent first protrusions 102. The connection flat 340 is located between two adjacent second protrusions 202. The connection flats 310, 330 and 340 are with a planar surface, a sand-blasting pattern or a dots pattern, for example. First structure 100 and second structure 200 are adjacent arranged and mirror reflection accordance with the connection flat 310.

Figure 12:
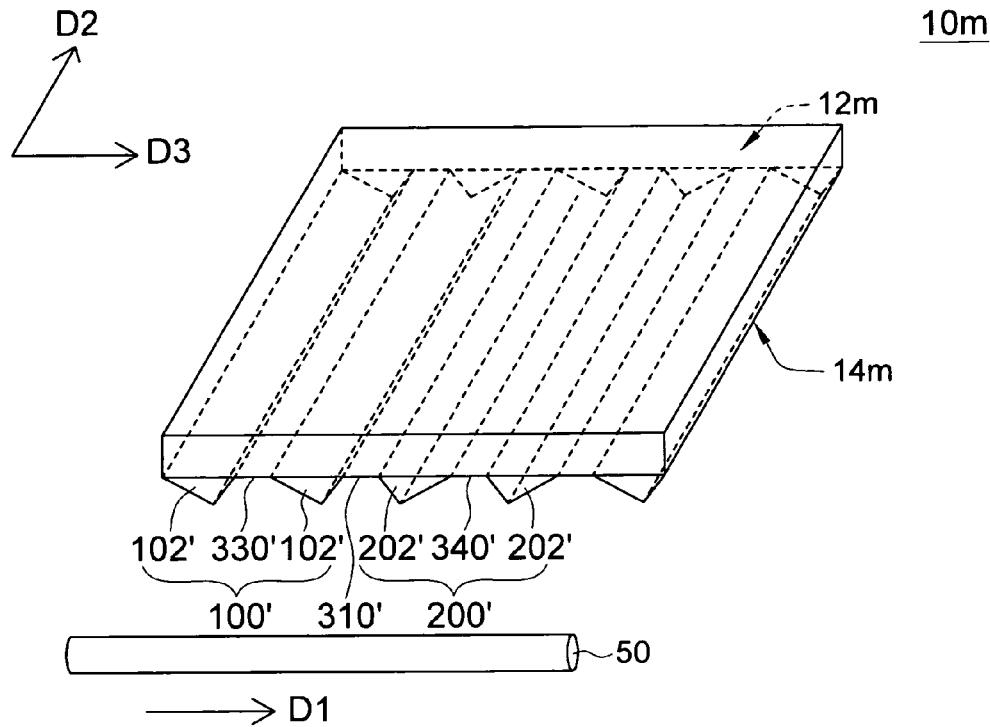

As shown in FIG. 12, light guide plate 10m according to the present embodiment of the present invention is similar to the light guide plate 10g. The difference is that connection flat 310' is located between first structure 100' and second structure 200'. The connection flat 330' is located between two adjacent first protrusions 102'. The connection flat 340' is located between two adjacent second protrusions 202'. The connection flats 310', 330' and 340' are with a planar surface, a sand-blasting pattern or a dots pattern, for example. First structure 100' and second structure 200' are adjacent arranged and mirror reflection accordance with the connection flat 310'.

Figure 13:
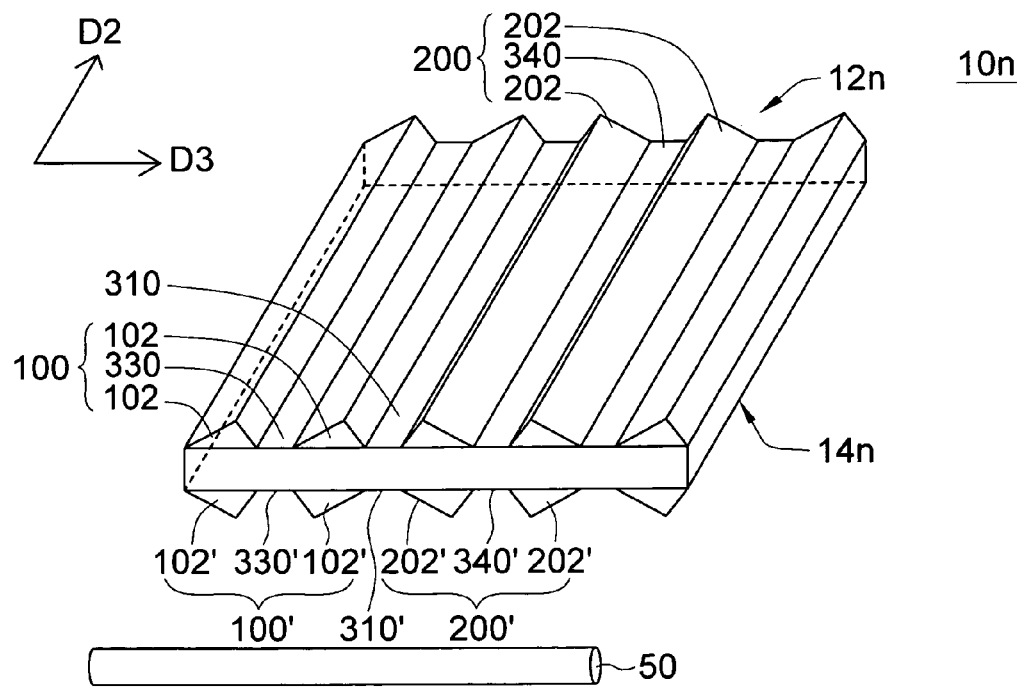

As shown in FIG. 13, in the present embodiment of the present invention, the upper surface 12n of light guide plate 10n is the same as the upper surface 12l of light guide plate 10l, and the bottom surface 14n is the same as the bottom surface 14m of the light guide plate 10m. In the present embodiment, extension direction of the first structure 100 of the upper surface 12n and that of the first protrusion 100' of the bottom surface 14n are parallel to each other or totally overlapped, for example, but not limited thereto. Extension direction of the first structure 100 of the upper surface 12n and that of the first structure 100' of the bottom surface 14n may form an acute angle or a right angle. Furthermore, at least one of the extension directions of the first structure 100 of the upper surface 12n and that of the first structure 100' of the bottom surface 14n may be perpendicular to the extension direction D1 of the light source 50.

Figure 14:
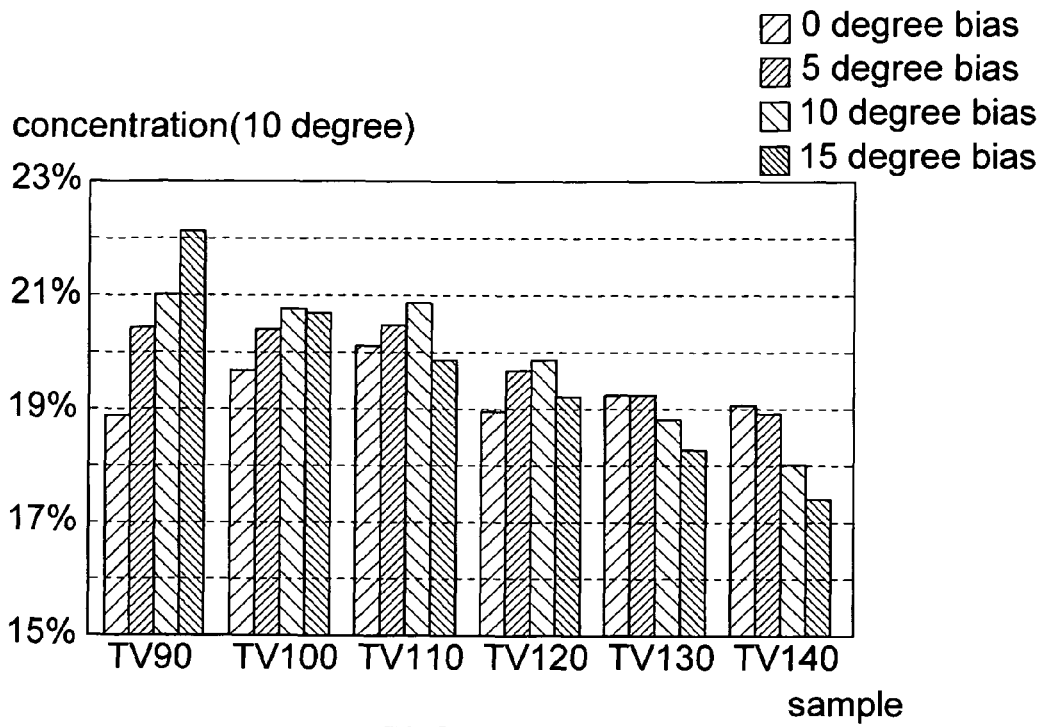
FIG. 14 shows the concentration of the direct view divided by that of 10 degree bias the direct view according to the light guide plate 10a of FIG. 2A with different top angles θ, bottom angles α1 and bottom angles α2 of the present invention.
Figure 15:
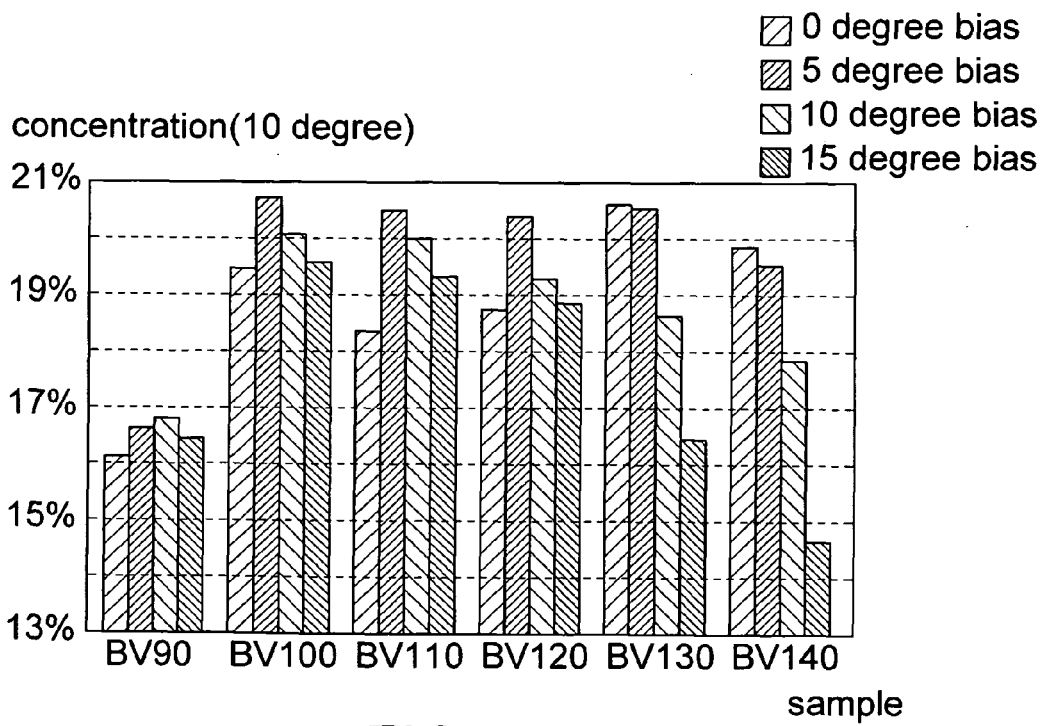
FIG. 15 shows the concentration of the direct view divided by that of 10 degree bias the direct view according to the light guide plate 10c of FIG. 3A with different top angles θ', bottom angles α1' and bottom angles α2' of the present invention.

FIGS. 14 to 15 are simulation results according to the present invention. FIG. 14 shows the concentration of the direct view divided by that of 10 degree bias the direct view according to the light guide plate 10a of FIG. 2A with different top angles θ, bottom angles α1 and bottom angles α2 of the present invention. FIG. 15 shows the concentration of the direct view divided by that of 10 degree bias the direct view according to the light guide plate 10c of FIG. 3A with different top angles θ', bottom angles α1' and bottom angles α2' of the present invention.

TABLE I

| sample | Bottom angles | Luminous flux at direct viewing angle (lm) | Luminous flux at 10 degree bias the direct viewing angle (lm) | Concentration of 10 degree (Luminous flux at 10 degree bias the direct viewing angle/ Luminous flux at direct viewing angle) |
|---|---|---|---|---|
| TV90 | 45_45 | 208.07 | 39.31 | 18.89% |
| | 50_40 | 216.53 | 44.29 | 20.45% |
| | 55_35 | 223.42 | 47.01 | 21.04% |
| | 60_30 | 226.64 | 50.15 | 22.13% |
| TV100 | 40_40 | 216.73 | 42.72 | 19.71% |
| | 45_35 | 221.81 | 45.24 | 20.40% |
| | 50_30 | 227.34 | 47.22 | 20.77% |
| | 55_25 | 229.60 | 47.59 | 20.73% |
| TV110 | 35_35 | 220.32 | 44.36 | 20.14% |
| | 40_30 | 224.16 | 45.94 | 20.49% |
| | 45_25 | 228.56 | 47.76 | 20.90% |
| | 50_20 | 228.48 | 45.44 | 19.89% |
| TV120 | 30_30 | 220.54 | 41.78 | 18.94% |
| | 35_25 | 225.68 | 44.45 | 19.69% |
| | 40_20 | 226.90 | 45.12 | 19.88% |
| | 45_15 | 226.19 | 43.46 | 19.21% |
| TV130 | 25_25 | 221.42 | 42.62 | 19.25% |
| | 30_20 | 225.37 | 43.40 | 19.26% |
| | 35_15 | 226.69 | 42.71 | 18.84% |
| | 40_10 | 225.98 | 41.32 | 18.29% |
| TV140 | 20_20 | 221.32 | 42.22 | 19.07% |
| | 25_15 | 223.77 | 42.34 | 18.92% |
| | 30_10 | 224.40 | 40.47 | 18.04% |
| | 35_5 | 219.04 | 38.16 | 17.42% |

According to Table I and FIG. 14, for sample TV90, comparing (bottom angle α1, bottom angle α2) being (45,45), (50,40), (55,35) and (60,30), while the top angle θ is 90 degree and the difference between two bottom angles α1 and α2 becomes greater, which means the greater the eccentric level is, total luminous fluxs at direct viewing angle are increasing, which are respectively 208 lm, 217 lm, 223 lm and 227 lm. As a result, when the light guide plate according to the present invention is applied to measure at direct viewing angle, the greater the eccentric level is, the more the total luminous fluxs at direct viewing angle is. Similarly, when the light guide plate according to the present invention is applied to measure at 10 degree bias the direct viewing angle, the greater the eccentric level is, the more the total luminous fluxs at direct viewing angle is. The calculation of concentration of 10 degree, which can determine the symmetry of brightness of light at horizontal viewing angle, is that luminous flux at 10 degree bias the direct viewing angle divides by luminous flux at direct viewing angle. For example, as for sample TV110, compare (bottom angle α1, bottom angle α2) are (40,30) and (45,25), while the top angle θ is 110 degree. Concentration (10 degree) of (bottom angle α1, bottom angle α2) being (45,25) is 20.90% which is better than 20.49%, concentration (10 degree) of (bottom angle α1, bottom angle α2) being (40,30). Therefore, by adjusting top angle θ and difference between bottom angle α1 and bottom angle α2 properly, the greater the eccentric level is, the better the concentration is.

TABLE II

| sample | Bottom angles | Luminous flux at direct viewing angle (lm) | Luminous flux at 10 degree bias the direct viewing angle (lm) | Concentration of 10 degree (Luminous flux at 10 degree bias the direct viewing angle/ Luminous flux at direct viewing angle) |
|---|---|---|---|---|
| BV90 | 45_45 | 214.80 | 34.67 | 16.14% |
| | 50_40 | 217.11 | 36.09 | 16.62% |
| | 55_35 | 219.81 | 36.95 | 16.81% |
| | 60_30 | 220.51 | 36.30 | 16.46% |
| BV100 | 40_40 | 222.62 | 43.39 | 19.49% |
| | 45_35 | 223.85 | 46.39 | 20.72% |
| | 50_30 | 224.37 | 45.08 | 20.09% |
| | 55_25 | 222.79 | 43.59 | 19.57% |
| BV110 | 35_35 | 222.53 | 40.84 | 18.35% |
| | 40_30 | 225.10 | 46.16 | 20.50% |
| | 45_25 | 225.41 | 45.05 | 19.98% |
| | 50_20 | 224.25 | 43.38 | 19.34% |
| BV120 | 30_30 | 223.35 | 41.88 | 18.75% |
| | 35_25 | 226.53 | 46.22 | 20.40% |
| | 40_20 | 225.40 | 43.45 | 19.28% |
| | 45_15 | 224.53 | 42.39 | 18.88% |
| BV130 | 25_25 | 222.22 | 45.82 | 20.62% |
| | 30_20 | 224.15 | 46.03 | 20.54% |
| | 35_15 | 223.93 | 41.74 | 18.64% |
| | 40_10 | 222.08 | 36.51 | 16.44% |
| BV140 | 20_20 | 219.74 | 43.64 | 19.86% |
| | 25_15 | 222.97 | 43.54 | 19.53% |
| | 30_10 | 222.80 | 39.70 | 17.82% |
| | 35_5 | 218.11 | 31.94 | 14.64% |

According to in Table II and FIG. 15, for sample BV130, comparing (bottom angle α1, bottom angle α2) being (25,25) and (30,20), and the top angle θ being 130 degree, luminous flux at direct viewing angle with difference of bottom angles being 10 degree is 224 lm, which is better than 222 lm, luminous flux at direct viewing angle with difference of bottom angles being 0 degree. When measuring 10 degree bias the direct viewing angle, luminous flux at direct viewing angle with difference of bottom angles being 10 degree is 46 lm, which is better than 45 lm, luminous flux at direct viewing angle with difference of bottom angles being 0 degree. Furthermore, measuring sample BV110 under concentration of 10 degree, comparing (bottom angle α1, bottom angle α2) being (35,35) and (40,30) and top angle being 110 degree, concentration (10 degree) of difference of bottom angles being 10 degree is better than that of difference of bottom angles being 0 degree.

As a result, mentioned structure formed on the upper surface (light output surface) is better than that formed on the bottom surface of the light guide plate according to the present invention, but not limited thereto.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light guide plate, having a first surface with a plurality of pairs of structures, each pair including a first structure and a second structure, wherein:
the first structures and the second structures are alternately arranged and the adjacent first and the second structures of each pair are mirror reflection with each other;

each of the first structures includes at least one first protrusion having a cross section of an eccentric triangle; and each of the second structures includes at least one second protrusion having a cross section of an eccentric triangle.

2. The light guide plate according to claim 1, wherein the eccentric triangle of at least one of the first protrusion and the second protrusion has a top angle of about 80 degree to 140 degree.

3. The light guide plate according to claim 1, wherein the eccentric triangle of at least one of the first protrusion and the second protrusion has two bottom angles with difference of about 2 degree to 30 degree.

4. The light guide plate according to claim 1, further having a second surface opposite to the first surface, wherein the second surface is with a flat, a sand-blasting pattern or a dots pattern.

5. The light guide plate according to claim 1, further having a second surface opposite to the first surface, wherein the second surface is with a plurality of pairs of structures, each pair including another first structure and another second structure, wherein:

the another first structures and the another second structures are alternately arranged and the adjacent another first and the another second structures of each pair are mirror reflection with each other;

each of the another first structures includes an another first protrusion having a cross section of an eccentric triangle; and each of the another second structures includes an another second protrusion having a cross section of an eccentric triangle.

6. The light guide plate according to claim 5, wherein the first protrusion of the first surface has an extension direction perpendicular to or parallel to that of the another first protrusion of the second surface.

7. The light guide plate according to claim 5, wherein the first surface and the second surface are mirror reflection.

8. The light guide plate according to claim 1, further having a second surface opposite to the first surface, wherein the second surface is with a plurality of V-shaped protrusions.

9. The light guide plate according to claim 1, wherein each of the first structures further includes a first connection flat located between the two adjacent first protrusions of the first structures.

10. The light guide plate according to claim 9, wherein each of the second structures further includes a second connection flat located between the two adjacent second protrusions of the second structures.

11. A backlight module, comprising:

a light guide plate, having a light input surface and a first surface with a plurality of pairs of structures, each pair including a first structure and a second structure, wherein:

the first structures and the second structures are alternately arranged and the adjacent first and the second structures of each pair are mirror reflection with each other;

each of the first structures includes at least one first protrusion having a cross section of an eccentric triangle; and each of the second structures includes at least one second protrusion having a cross section of an eccentric triangle; and a light source disposed adjacent to the light input surface.

12. The backlight module according to claim 11, wherein the extension direction of the light source and that of the first protrusion of the first structures form an angle of about 75 degree to 105 degree.

13. The backlight module according to claim 11, wherein the extension direction of the light source and that of the first protrusion of the first structures form an angle of about 90 degree.

14. The backlight module according to claim 11, wherein the light source comprises a plurality of light-emitting diodes (LEDs), cold cathode fluorescent lamp (CCFL) or external electrode fluorescent lamp (EEFL).

15. A liquid crystal display, comprising:

a backlight module, comprising:

a light guide plate, having a light input surface and a first surface with a plurality of pairs of structures, each pair including a first structure and a second structure, wherein:

the first structures and the second structures are alternately arranged and the adjacent first and the second structures of each pair are mirror reflection with each other;

each of the first structures includes at least one first protrusion having a cross section of an eccentric triangle; and each of the second structures includes at least one second protrusion having a cross section of an eccentric triangle; and a light source disposed adjacent to the light input surface; and a liquid crystal display panel disposed above the backlight module.

* * * * *